United States Patent Office 3,695,918 Patented Oct. 3, 1972

3,695,918

HEAT SEALABLE FILM AND PROCESS FOR MAKING SAME

Peter Manners Ward, Wheathampstead, England, assignor to Imperial Chemical Industries Limited, London, England No Drawing. Filed Sept. 14, 1970, Ser. No. 72,206
Claims priority, application Great Britain, Oct. 2, 1969, 48,460/69
Int. Cl. B32b *27/40;* C09j *7/00*
U.S. Cl. 117—47 A 14 Claims

ABSTRACT OF THE DISCLOSURE

Using resins containing an isocyanate ended polyurethane of average molecular weight more than 1000 and an organic polyisocyanate containing isocyanurate rings and having an average of more than two isocyanate groups per molecule as an intermediate adhesive coat between a thermoplastic film and a coating of a heat sealable material.

This invention relates to the production of coated film, to improved coated films and in particular to heat seal coated polyolefine film.

According to the present invention we provide a process for the production of organic thermoplastic polymeric films coated with a heat sealable material in which uncoated film is subjected to a treatment as hereinafter described on at least one of its surfaces to improve the bonding properties of that surface and then coated on at least one of the treated surfaces with a resin which contains an isocyanate-ended polyurethane of average molecular weight greater than 1000, an organic polyisocyanate containing isocyanurate rings and having an average of more than two isocyanate groups per molecule; drying the coating on the film; overcoating the coated film with a layer of a dispersion or a solution of a heat sealable polymeric material and heating the over-coated film to dry the layer of the polymeric material and to cure the resin so that it becomes adhesively bonded to the layer of the polymeric material and to the organic thermoplastic polymeric film.

Before any coating is applied to the film its surface should be subjected to a treatment to improve the bonding properties of its surface; this treatment may be a physical or a chemical treatment which oxidises the film surface and thus improves its bonding properties. Examples of suitable chemical treatments are to treat the surface of the film with oxidising agents such as chromic acid in sulphuric acid, hot nitric acid or exposure of the surface to ozone. Alternatively, the surface of the film may be subjected to exposure of the surface to corona discharge (such treatment is described in British Pat. No. 715,914); exposure of the surface to ionising radiation, or exposure of the surface to a flame for a sufficient time to cause superficial oxidation but not long enough to cause distortion of its surface. The preferred treatment, because of its effectiveness and simplicity, is the high voltage electric stress accompanied by corona discharge. The treated surface of the film is then over-coated with the resin; the preparation of the resins which are coated onto the surface treated film in the process of the present invention is described in British Pat. No. 1,052,042.

The isocyanate-ended polyurethanes of molecular weight more than 1000 may be obtained by interaction of a molecular excess of an organic polyisocyanate with a polyhydroxy compound of molecular weight greater than 400, and preferably between 400 and 5,000, optionally in conjunction with a hydroxy compound of molecular weight below 400.

Examples of polyhydroxy compounds of molecular weight greater than 400, include polyethers, polyetherthioethers, polyesters and polyacetals. These polymers should preferably be linear or only slightly branched. Examples of suitable polyethers include polymers and copolymers of cyclic oxides, for example 1:2-alkylene oxides such as ethylene oxide, epichlorohydrin, 1:2-propylene oxide, 1:2-butylene oxide and 2:3-butylene oxide, oxycyclobutane and substituted oxycyclobutanes, and tetrahydrofuran. Alternatively polyethers such as are prepared for example by the polymerisation of an alkylene oxide in the presence of a basic catalyst and water, glycol, a polyhydric alcohol such as glycerol, or a primary monoamine or mixtures of such polyethers may be used. The preferred polyethers are polypropylene ether polymers which have an equivalent weight per hydroxyl group of between 200 and 1500.

If a polyester is used it may be made by conventional means from for example dicarboxylic acids and dihydric alcohols. Suitable dicarboxylic acids include succinic, glutaric, adipic, pimelic, suberic, azelaic, sebacic, phthalic, isophthalic, and terephthalic acids and mixtures of these. Small proportions of polycarboxylic acids such as trimesic acid may also be used. Suitable glycols include ethylene glycol, 1:2-propylene glycol, diethylene glycol, dipropylene glycol, trimethylene glycol, 1:2-, 1:3-, 2:3- and 1:4-butylene glycols, neopentyl glycol, pentamethylene glycol, and hexamethylene glycol and mixtures of these. The preferred polyesters have melting points below 60° C. and are derived from glycols having from two to eight carbon atoms and dicarboxylic acids having from four to ten carbon atoms. Particularly suitable are polyesters of molecular weight between 500 and 2500 derived from such dicarboxylic acids, especially adipic acid, and a glycol or mixture of glycols at least one of which contains at least one secondary hydroxyl group.

The hydroxy compound of molecular weight below 400 which may optionally be condensed with the polyisocyanate in conjunction with the polyhydroxy compound may be a mono-functional alcohol such as methanol, ethanol or butanol, or a glycol such as ethylene glycol, diethylene glycol, butylene-1:3-glycol, trimethylene glycol, tetramethylene glycol, propylene glycol, dipropylene glycol, neopentyl glycol and thiodiglycol, or a polyol such as glycerol, trimethylolethane, trimethylolpropane, hexanetriol, pentaerythritol sorbitol or mannitol.

The organic polyisocyanate which is interacted with the hydroxy compound of molecular weight below 400 to prepare the isocyanate-ended polyurethane may be for example an aliphatic or cycloaliphatic diisocyanate. Alternatively it may be a polyurethane polyisocyanate obtained by interaction of excess of a polyisocyanate, such as those hereinbefore described, with a polyhydroxy compound such as ethylene glycol, butylene glycol, diethylene glycol, neopentyl glycol, trimethylolpropane, glycerol or hexanetriol. If desired the polyisocyanate may be polymerised to afford polyisocyanates containing isocyanurate rings.

The preparation of the isocyanate-ended polyurethane is carried out in conventional manner usually by heating the ingredients together at a temperature between 40° C. and 160° C. and preferably between 70° C. and 130° C. The reaction may be carried out in a solvent inert to isocyanates, particularly suitable solvents being esters, ketones and halogenated hydrocarbons. It is usually preferred that the reaction is carried out under slightly acidic conditions to minimise side reactions leading to high viscosity products. Although polyisocyanates are usually acidic it may be necessary in order to ensure acidity of the reaction mixture to add an acidic compound such as a mineral or organic acid or acid halide in amount equivalent to 0.005% calculated as halide on the weight of polyisocyanate present. In order to ensure that the polyurethane possesses terminal isocyanate groups the amount of polyisocyanate used in its preparation should be such that there is an excess of isocyanate groups over that required to react with the hydroxyl groups present.

Particularly useful isocyanate-ended polyurethane are obtained from organic polyisocyanates and polyesters or mixtures of polyesters with a hydroxy compound of low molecular weight wherein the polyester or mixture possesses an average of not more than three hydroxyl groups per molecule and the organic polyisocyanate is a diisocyanate used in amount so that there are from 1.05 to 2.0 and preferably from 1.2 to 1.5, isocyanate group for each hydroxyl group.

The organic polyisocyanates containing isocyanurate rings used in our invention may be prepared by the polymerization of polyisocyanates in the presence of the catalysts known to assist this polymerization. For example a diisocyanate either alone or in a suitable inert solvent may be heated with a basic catalyst such as an aliphatic tertiary amine, a basic metallic compound such as an alkali or alkaline earth metal oxide, hydroxide, carbonate, alcoholate or phenate, an alkali metal derivative of an enolisable compound or a metallic salt of a weak organic acid. Co-catalysts may be used such as alcohols, phenols, mono-N-substituted carbamic esters or cyclic oxides.

The organic polyisocyanate containing isocyanurate rings may be derived from an aliphatic or cycloaliphatic diisocyanate such as may be used in preparing the isocyanate-ended polyurethane.

The resins which are coated onto the treated film in the process of our invention may be obtained by blending the ingredients together in any order. The relative proportions of isocyanate-ended polyurethane and isocyanurate polyisocyanates are preferably within the range from 12:1 to 1:12 by weight, but proportions outside this range may be used if desired. The solvent or dispersant in which the resin is applied to the film should be non-reactive to isocyanates, for example an ester, or ketone, or mixtures of these with, for example hydrocarbon, or halogenated hydrocarbon may be used. Suitable solvents are urethane grades of esters and ketones such as ethyl acetate, ethoxyethyl acetate, butoxyethyl acetate, methylethylketone, methylisobutylketone, methoxyhexanone which may be mixed with aromatic hydrocarbon solvents, for example xylene.

Our preferred resins are those prepared by reaction of polyethylene propylene adipate with tolylene diisocyanate in a suitable solvent and then reacting the product of this reaction with an equal amount by weight of an organic polyisocyanate containing isocyanurate rings dissolved in a suitable solvent.

The coating resin used in the process of this invention may be modified by blending with other suitable materials, for example the water resistance of the coated film may be improved if the resin is blended with another thermosetting resin, e.g. melamine formaldehyde or a urea formaldehyde or epoxy condensation resin. The processability may be improved if the resin is blended with a small amount of a polyol. Alternatively the coating resin may be blended with an acrylic resin such as those described in British Pat. No. 1,134,876.

The resin may be applied to the treated surface or surfaces of the film as a dispersion or as a solution which is preferably in an organic solvent or dispersant. Aqueous coating techniques cannot be used because the isocyanate groups in the coating resin react with the water. Examples of suitable organic solvents include alcohols, aromatic hydrocarbon solvents such as xylene or mixtures of such solvents as is appropriate.

After the coating of the resin has been applied to the treated surface or surfaces of the film it should be dried off on the film before any further coating is applied. The resin is at least partially cured during the drying operation so that it adheres to the base film and will not be removed by the application of the top coating material. However, we prefer that the temperature at which the coating is dried off is low because if the drying temperature is too high the resin will cure too much and cannot be further cured after the application of the top coating to sufficiently adhere to the top coating. Furthermore, the process of this invention is particularly applicable to applying heat sealable coatings to oriented films and as oriented films tend to be dimensionally unstable at elevated temperatures it is desirable that the time to which the film is subjected to elevated temperatures during coating should be as short as possible. Similarly it is desirable that the temperatures to which the fim is subjected should be as low as possible consistent with satisfactory top coat adhesion to the film. We prefer that the resin be dried off on the film at a temperature in the range 60° C. to 120° C. preferably 60° C. to 90° C.

When the coating of the resin has been dried off on the film the coated film may then be overcoated with a coating of a heat sealable polymer.

By a heat sealable polymer is meant any polymer or copolymer which can be heat sealed on the film to which it is applied by standard heat sealing equipment (see H. P. Zade "Heat Sealing and High Frequency Welding of Plastics," Temple Press, London, 1959).

Because they give hard coatings and good heat seal strengths and are also resistant to moisture and have low gas permeability, our preferred heat seal coatings are copolymers of vinylidene chloride with acrylonitrile. It is particularly preferred to use copolymers containing between 80% and 95% by weight of vinylidene chloride and up to 20% by weight acrylonitrile, these copolymers may contain other monomers such as acrylic acid, itaconic acid and methacrylic acid. The coating of the heat sealable material may be applied to the film as a solution or a dispersion but the solvent or dispersant should not be such that it will dissolve the resin coating already on the film. For economic reasons application as an aqueous disperson is preferred.

The liquid medium from which the heat sealable coating is applied to the film should not adversely affect the film or the coating of the resin thereon, particularly if the heat sealable material is applied as a solution the solvent should not dissolve the resin.

Other polymeric coatings which may be applied as dispersions are polyvinyl acetate, partially hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and other dicarboxylic acid with a glycol, e.g. those containing not more than 4.0 molecular proportions of combined terephthalic acid to one molecular proportion of combined sebacic acid; copolymers of vinylidene chloride and vinyl chloride, copolymers of vinyl acetate with ethylene and copolymers of vinyl chloride with ethylene.

An aqueous dispersion of the heat sealable polymer may be obtained by grinding and dispersing it in water using a suitable emusifying agent. It is, however, preferred to prepare such dispersions by polymerzing the monomeric constituents of the heat seal coating polymer in aqeuous emulsion using an emulsifying agent to keep the polymer formed in a dispersed state. It is preferred to use a cationic emulsifying agent since good antistatic properties are thereby conferred on the heat seal coated film, although some anionic emulsifying agents also confer antistatic properties on the film and may thus be used in the preparation of the dispersion of the heat seal coating polymer.

The heat seal coating dispersion may contain additives other than cationic surface active agents, for instance antioxidants, dyes, pigments, lubricants, anti-blocking agents and ultra violet light stabilisers. It is particularly useful to add slip agents. These fall into two classes (a) comminuted solids which are insoluble in the heat seal coatings, for instance, starch, talc, zinc oxide, calcium carbonate, magnesium carbonate, diatomaceous earths such as "Superfloss," silica, kaolin, titanium dioxide, triferric tetroxide and other inorganic oxides, carbonates, silicates, aluminates, and alumino-silicates and finely dispersed polymers such as polypropylene and polyvinyl chloride, the particle size of the slip agent being normally in the range 0.1 to 20 microns, and preferably for best effect in the range 0.2 to 5 microns; (b) waxy additives such as the unsaturated fatty acid amines, saturated fatty acid amines such as palmitamide, stearamide, distearamide and alkylene distearamides such as methylene and ethylene distearamide; hydroxylated fatty acid amides such as hydroxy stearamide, hydrogenated castor oil, ester type waxes, ether waxes and other hard waxes.

The top coating of the heat sealable polymer must then be dried off on the film. The heating to dry the film also completes the cure of the resin so that it becomes adhesively bonded to both the film and the coating of the heat sealable material. Because the films are generally dimensionally unstable at elevated temperatures it is desirable that the temperature at which the top coating is dried be as low as possible consistent with effective drying of the top coating and complete curing of the resin. If the top coating is applied in an aqueous medium the drying temperature should be above 100° C. and we have found that particularly good films are obtained if the top coating is dried off at a temperature in the range from 110° C. to 140° C.

Our invention is applicable to films of any organic thermoplastic polymeric material, for example polymers and copolymers of alpha olefins such as ethylene, propylene, butene and 4-methyl pentene-1; linear polyesters such as polyethylene terephthalate and polyethylene-1:2-diphenoxyethane-4:4'-dicarboxylate and polymers and copolymers containing vinyl chloride. The films coated by this invention may be unoriented or may be oriented in one or both directions in the plane of the film and if oriented in both directions the orientation may be equal to those directions or unequal, for example with the higher degree of orientation in a preferred direction (usually the longitudinal direction). The oriented films may be heat set either before or after the coating treatment. Our invention is particularly applicable to the production of heat sealable biaxially oriented polypropylene films. One major use for thermoplastic films is the overwrapping of articles and it is always necessary to seal two pieces of film together to complete the wrapping around an article. Oriented films tend to shrink when they are heated to near their melting point and thus it is difficult to produce satisfactory seals by superimposing two pieces of film and welding them under heat and pressure. It is, therefore, necessary to coat the film with a material that can be sealed at a lower temperature. However, it is generally difficult to stick coatings to thermoplastic films, especially polyolefine films which have a particularly inert surface. However, we have found that the coated films produced according to the process of this invention exhibit exceptionally high adhesion of heat seal coat to base film and the films may be readily heat sealed to form a very strong bond. Thus, values of at least 200 grams/inch for the adhesion of the heat seal coat and heat seal strengths of at least 250 grams/inch may be obtained.

The present invention also provides organic thermoplastic films which have been treated as hereinbefore described on at least one surface so as to improve the bonding properties of that surface and which are coated on at least one of the treated surfaces with a layer of a heat sealable material, said coated film being provided with an intermediate coating between the film and the layer of the heat sealable material, said intermediate coating comprising a resin containing an isocyanate-ended polyurethane of average molecular weight more than 1000 and an organic polyisocyanate containing isocyanurate rings and having an average of more than two isocyanate groups per molecule.

The preferred films of the present invention are oriented films of thermoplastic materials and particularly biaxially oriented polyolefin films especially biaxially oriented polypropylene. The preferred heat sealable materials are copolymers of vinylidene chloride with acrylontrile, especially copolymers containing between 80% and 95% by weight of vinylidene chloride and up to 20% by weight of acrylonitrile together with minor amounts of other monomers is required.

The present invention is illustrated but in no way limited by reference to the accompanying examples.

EXAMPLE 1

A coating consisting of a solution in ethyl acetate of the reaction product of 1 mole of polyethylene propylene adipate of molecular weight 850 with 1.6 moles of tolylene di-isocyanate mixed with an equal amount by weight (on a solids basis) of an organic polyisocyanate containing isocyanurate rings was applied to both sides of a biaxially oriented polypropylene film. The film had been prepared by the tubular process and surface treated by corona discharge treatment.

The coating was applied to both sides of the film to a thickness of $1\times10^{-5}$ inches and was dried off on the film at a temperature of 75° C.

The coated film was then overcoated with a layer of a heat seal coating polymer. This coating consisted of a dispersion in water containing 35% by weight solids of an 88:12 vinylidene chloride acrylonitrile copolymer; the dispersion was emulsified with 5% by weight of the hydrochloric acid salt of a condensation product of 1 mole of tallow amine with 2 moles of ethylene oxide and also contained 2% by weight of the solids present of colloidal sized polyvinyl chloride particles.

The coating was applied to both sides of the film to a thickness of $7\times10^{-5}$ inches and dried at 115° C. for 12 seconds.

The "heat seal strengths" of the films and the "adhesion" of the coating to the film were then measured. The heat seal strength is measured by sealing together two pieces of film by pushing them against each other under a pressure of 5 p.s.i. at 130° C. for 2 seconds. The pressure is applied using a heated bar 12 inches long and 1 inch wide. The heat seal strength is the force required per inch width of the sealed films to separate the films at a rate of 12 inches per minute. The "adhesion" of the coating to the base film is considered to be the force required to peel the coating from a 1 inch wide strip of the film at a rate of 12 inches per minute. The test is made by applying a strip of "Sellotape" to the film and measuring the force required to peel off the coating by removing the "Sellotape" through an angle of 180° C.

The films were wound into a roll and the seal strengths and adhesion were measured for both the inside and the outside coating of the wound film; these are designated "IN" and "OUT" respectively.

The results obtained on samples tested immediately after coatings and 4 weeks later were as follows:

| | Initial | After 4 weeks at 38° C. and 90% relative humidity |
|---|---|---|
| Heat seal strength, grams/inch: | | |
| IN | 265 | 225 |
| OUT | 285 | 250 |
| Adhesion, grams/inch: | | |
| IN | 250 | 100 |
| OUT | 400 | 250 |

EXAMPLE 2

The process of Example 1 was repeated using the same basic first coating with the addition of 0.4% by weight on solids of dimethylbenzylamine as curing catalysts. The coating was applied to a thickness of $1\times10^{-5}$ inches on both sides of the film and dried for one minute at 90° C.

The coating of the heat sealable polymer consisted of a 40% by weight solids dispersion in water of a 90:10 vinylidene chloride/methyl acrylate copolymer emulsified with 2% by weight of the sodium salt of a sulphonated diesel oil and containing 2% by weight on solids of colloidal sized polyvinyl chloride particles. The heat seal coating was applied to a thickness of $7\times10^{-5}$ inches and dried at 110° C. for 1 minute.

The heat seal strength and the adhesion were measured by the techniques as were used in Example 1. The results in samples immediately after coating and 3 weeks later were as follows:

| | Initial | After 4 weeks at 38° C. and 90% relative humidity |
|---|---|---|
| Heat seal strength, grams/inch: | | |
| IN | 285 | 250 |
| OUT | 325 | 300 |
| Adhesion, grams/inch: | | |
| IN | N.P. | 210 |
| OUT | N.P. | (1) |

1 Only peeled in patches.

NOTE.—N.P. signifies that it was not possible to peel the coating from the film using the test method set out.

I claim:

1. A process for the production of organic thermoplastic polymeric films coated with a heat sealable material which comprises oxidizing at least one surface of an uncoated organic thermoplastic film to improve the bonding properties of that surface, coating at least one of the treated surfaces with an anhydrous dispersion or solution of a resin consisting essentially of an isocyanate-ended polyurethane of average molecular weight greater than 1,000, an organic polyisocyanate containing isocyanurate rings and having an average of more than two isocyanate groups per molecule, the relative proportions of the isocyanate-ended polyurethane and isocyanurate polyisocyanate being within the range from 12:1 to 1:12 by weight; drying the coating on the film; over-coating the coated film with a layer of a dispersion or a solution of a heat sealable polymeric material anl heating the over-coated film to dry the layer of the polymeric material and to cure the resin so that it becomes adhesively bonded to the layer of the polymeric material and to the organic thermoplastic polymeric film.

2. A process according to claim 1 in which the surface of the film is oxidized by a corona discharge treatment.

3. A process according to claim 1 in which the isocyanate-ended polyurethane of molecular weight more than 1000 is obtained by interaction of a molecular excess of an organic polyisocyanate with a polyhydroxy compound of molecular weight greater than 400.

4. A process according to claim 1 in which the solvent or dispersant for the resin is an ester or a ketone or a mixture of an ester or a ketone with a hydrocarbon or a halogenated hydrocarbon.

5. A process according to claim 1 in which the resin is prepared by reaction of polyethylene propylene adipate with tolylene diisocyanate in a suitable solvent and reacting the product of this reaction with an equal amount by weight of an organic polyisocyanate containing isocyanurate rings.

6. A process according to claim 1 in which the resin is dried on the film at a temperature in the range 60° C. to 120° C.

7. A process according to claim 1 in which the heat sealable polymeric material is a copolymer containing between 80% and 95% by weight of vinylidene chloride and up to 20% by weight acrylonitrile.

8. A process according to claim 1 in which the coating of the heat sealable polymer is dried on the film at a temperature in the range of from 110° C. to 140° C.

9. A process according to claim 1 in which the organic thermoplastic polymeric film is a film of a polymer or copolymer of an alpha olefin.

10. A process according to claim 1 in which the organic thermoplastic polymeric film is oriented in one or both directions in the plane of the film.

11. An organic thermoplastic film, at least one surface of which has been oxidized to improve the bonding properties of that surface, which film has been coated on at least one of the treated surfaces with a layer of a heat sealable polymeric material, said coated film being provided with an intermediate coating between the film and the layer of the heat sealable material, said intermediate coating comprising a resin consisting essentially of an isocyanate-ended polyurethane of average molecular weight more than 1,000 and an organic polyisocyanate containing isocyanurate rings and having an average of more than two isocyanate groups per molecule, the relative proportions of the isocyanate-ended polyurethane and isocyanurate polyisocyanate by weight being within the range of 12:1 to 1:12.

12. A film according to claim 11 in which the organic thermoplastic film is polypropylene film.

13. A film according to claim 11 in which the film is oriented in one or both directions in its plane.

14. A film according to claim 11 in which the heat sealable polymeric material is a copolymer containing between 80% and 95% by weight of vinylidene chloride and up to 20% by weight of acrylonitrile.

References Cited

UNITED STATES PATENTS

| | | | |
|---|---|---|---|
| 3,023,126 | 2/1962 | Underwood et al. | 117—76 F |
| 3,250,639 | 5/1966 | Stead | 117—76 F X |
| 3,552,998 | 1/1971 | Weyna et al. | 117—76 F |
| 3,262,808 | 7/1966 | Crooks et al. | 117—138.8 EX |
| 3,505,105 | 4/1970 | MacFarlane et al. | 117—161 KP X |
| 3,386,962 | 6/1968 | Damusis | 117—161 KP X |
| 3,517,002 | 6/1970 | Heiss | 117—161 KP X |

RALPH HUSACK, Primary Examiner

U.S. Cl. X.R.

117—68, 76F, 76A, 90, 122 H, 138.8 E, F, UA; 260—858